US011831466B2

(12) United States Patent
Mutter et al.

(10) Patent No.: US 11,831,466 B2
(45) Date of Patent: Nov. 28, 2023

(54) USER STATION FOR A SERIAL BUS SYSTEM, AND METHOD FOR TRANSMITTING A MESSAGE IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 391 days.

(21) Appl. No.: 17/287,977

(22) PCT Filed: Oct. 23, 2019

(86) PCT No.: PCT/EP2019/078818
§ 371 (c)(1),
(2) Date: Jun. 7, 2021

(87) PCT Pub. No.: WO2020/088999
PCT Pub. Date: May 7, 2020

(65) Prior Publication Data
US 2021/0377070 A1 Dec. 2, 2021

(30) Foreign Application Priority Data
Oct. 31, 2018 (DE) .................... 10 2018 218 720.7

(51) Int. Cl.
*H04L 12/407* (2006.01)
*H04L 1/00* (2006.01)
*H04L 12/40* (2006.01)

(52) U.S. Cl.
CPC .......... *H04L 12/407* (2013.01); *H04L 1/0041* (2013.01); *H04L 12/40013* (2013.01);
(Continued)

(58) Field of Classification Search
CPC ................. H04L 12/407; H04L 1/0041; H04L 12/40013; H04L 2001/0094; H04L 2012/40215; H04L 12/40
See application file for complete search history.

(56) References Cited

U.S. PATENT DOCUMENTS 9,606,948 B2 * 3/2017 Monroe ................ G06F 13/364
10,063,391 B2 * 8/2018 Walker ................ H04L 12/4135
(Continued)

FOREIGN PATENT DOCUMENTS

CN     103748838 A    4/2014
CN     104092515 A   10/2014
(Continued)

OTHER PUBLICATIONS

International Search Report for PCT/EP2019/078818 dated Jan. 8, 2020.
ISO 11898-1:2015 Standard, 2015, pp. 1-74.

*Primary Examiner* — Abdullahi Ahmed
(74) *Attorney, Agent, or Firm* — NORTON ROSE FULBRIGHT US LLP; Gerard Messina

(57) ABSTRACT

A user station is described. The user station includes a communication control device for transmitting and/or receiving messages to/from a bus of a serial bus system, a format switchover checking unit for checking whether the communication control devices of the bus system have switched over the format of the messages from a first format in a first communication phase to a second format for a second communication phase, and a transceiver device which, for transmitting in the first format, generates a first bus state for a first digital data state of the messages and a second bus state for the second digital data state of the messages so that the second bus state can overwrite the first bus state. The transceiver device, for transmitting in the second format, generates different bus states so that the bus (Continued)

states for the different digital data states of the messages cannot overwrite one another.

12 Claims, 3 Drawing Sheets

(52) U.S. Cl.
CPC ............... *H04L 2001/0094* (2013.01); *H04L 2012/40215* (2013.01)

(56) References Cited

U.S. PATENT DOCUMENTS

| | | |
|---|---|---|
| 2014/0365693 A1 | 12/2014 | Monroe et al. |
| 2020/0057745 A1* | 2/2020 | Mutter .............. H04L 12/40143 |
| 2021/0320816 A1* | 10/2021 | Mutter .............. H04L 12/40032 |
| 2021/0399919 A1* | 12/2021 | Mutter .............. H04L 12/40032 |
| 2021/0406213 A1* | 12/2021 | Mutter ................ H04L 12/4135 |
| 2022/0060353 A1* | 2/2022 | Mutter .............. H04L 12/40013 |
| 2022/0239576 A1* | 7/2022 | Mutter ................ H04L 12/4013 |

FOREIGN PATENT DOCUMENTS

| | | |
|---|---|---|
| CN | 104995873 A | 10/2015 |
| DE | 102015202242 A1 | 8/2016 |

\* cited by examiner

USER STATION FOR A SERIAL BUS SYSTEM, AND METHOD FOR TRANSMITTING A MESSAGE IN A SERIAL BUS SYSTEM

FIELD

The present invention relates to a user station for a serial bus system, and a method for transmitting a message in a serial bus system, via which a communication in the bus system is selectively possible according to a first communication protocol or a second communication protocol, the communication according to the second communication protocol taking place with a different physical layer as well as a higher bit rate and a larger data field than with the first communication protocol.

BACKGROUND INFORMATION

For the communication between sensors and control units, for example in vehicles, more and more frequently a bus system is used in which data are transferred as messages under the ISO 11898-1:2015 standard, as a CAN protocol specification with CAN FD. The messages are transferred between the user stations of the bus system, such as the sensor, control unit, transducer, etc. In the introduction phase, at the present time in the first step CAN FD is generally used in the vehicle with a data bit rate of 2 Mbit/s for the transfer of bits of the data field, and with an arbitration bit rate of 500 kbit/s for the transfer of bits of the arbitration field.

For the transfer of the arbitration field as well as for the transfer of the data field, the same physical layer is used. A distinction is made between two bus states, namely, "dominant" (which corresponds to the logical or digital 0) and "recessive" (which corresponds to the logical or digital 1). Since the recessive bus state is not actively driven, the recessive bus state may be overwritten by the dominant bus state, thus making the arbitration possible. However, the recessive bus state is set only relatively slowly by terminating resistors of the bus system. On the one hand this prevents a faster data transfer. However, on the other hand the arbitration according to the above-mentioned ISO 11898-1: 2015 standard ensures that only one of the user stations transmits its data exclusively and free of collisions during the transfer of the data field. As a result, data are transferable via the bus more securely after the arbitration, without the need for repetition. Overall, this contributes to an acceleration of the data transfer.

Thus, in order to maintain the advantage of the arbitration while still increasing the transfer rate even further than previously, an approach must be found which mitigates the disadvantages of the slow transfer rate during the arbitration according to the above-mentioned ISO 11898-1:2015 standard.

SUMMARY

An object of the present invention is to provide a user station for a serial bus system, and a method for transmitting a message in a serial bus system, which solve the above-mentioned problems. In particular, in accordance with an example embodiment of the present invention, a user station for a serial bus system, and a method for transmitting a message in a serial bus system are provided in which a high data rate or bit rate and an increase in the quantity of the useful data per frame may be achieved with a high level of error robustness.

The object may be achieved by a user station for a serial bus system in accordance with an example embodiment of the present invention. In accordance with an example embodiment of the present invention, the user station includes a communication control device for transmitting messages to a bus of the bus system and/or for receiving messages from the bus of the bus system, and a format switchover checking unit for checking whether the communication control device of the bus system has switched over a format of the messages from a first format in a first communication phase to a second format for a second communication phase, and a transceiver device which, for transmitting in the first format, is designed to generate a first bus state for a first digital data state of the messages and a second bus state for the second digital data state of the messages in such a way that the second bus state can overwrite the first bus state, and the transceiver device, for transmitting in the second format, being designed to generate different bus states in such a way that the bus states for the different digital data states of the messages cannot overwrite one another.

By use of the user station, it is possible in particular to carry out a communication of errors via error frames (error flags) in the arbitration phase, even when different physical layers are used in the arbitration phase and the data phase.

Thus, in a first communication phase an arbitration provided by CAN may be carried out, and in a second communication phase the transfer rate may still be increased considerably compared to CAN FD.

As the result of transmitting the "res bit:=1" that is present in CAN FD, the user station allows a switch to be made over to a new frame format, and in addition the switchover of the frame format is safeguarded in such a way that all receiving user stations obtain the switchover without errors, or in the event of an error, may report the error with the aid of error frames (error flags). A switch may subsequently be made over to a different physical layer that allows a higher bit rate.

The above-described user station understands frames that are transmitted or received in a CAN FD format or conventional CAN format, as well as new frames for which the above-described user station is designed. The other user stations of the bus system ignore frames in the format for which the above-described user station is designed, but do not interfere with these frames. Accordingly, the method carried out by the user station may also be used when at least one CAN FD user station that transmits messages according to the CAN FD protocol is also present in the bus system.

Due to the coexistence and interoperability of user stations that operate according to the CAN FD communication protocol, and user stations that operate according to a CAN FD successor communication protocol, referred to below as CAN NG, a seamless migration path from CAN FD toward CAN NG is possible. Individual user stations of the bus system may thus be upgraded to the CAN NG user station described above, even if the remaining user stations of the bus system continue to use CAN FD. Therefore, no gateways between CAN FD and CAN NG bus systems are necessary.

All of the above-stated properties of the user station described above will increase the acceptance of the above-described user station.

Advantageous further embodiments of the user station in accordance with the present invention are described herein.

According to one particular embodiment variant of the present invention, the communication control device is designed to switch the format over from the first format into the second format, and thus to change into the second communication phase, based on a predetermined switchover bit sequence in the first communication phase, and the format switchover checking unit being designed to check whether the communication control devices of the bus system have switched over from the first format to the second format, using a predetermined check bit sequence that is transmitted after the predetermined switchover bit sequence.

According to one option of the present invention, the predetermined switchover bit sequence constitutes an FDF bit and a res bit of a CAN message.

The predetermined check bit sequence possibly includes a res2 bit, a res3 bit, and a res4 bit that are situated after the res bit in the message, and
 a res3 bit being transmitted at least one to five times in succession.

In accordance with an example embodiment of the present invention, the communication control device may be designed to transmit and/or to receive bits of the message with a slower, and thus lower, bit rate in the first communication phase than in the second communication phase.

It is possible for the communication control device to be designed to transmit the predetermined switchover bit sequence and the predetermined check bit sequence at the bit rate for the first communication phase. The user station is thus fully compatible with the presently applicable ISO 11898-1:2015 standard as a CAN protocol specification with CAN FD.

In the first communication phase between the user stations of the bus system, it may be negotiated which of the user stations in the subsequent second communication phase obtains, at least temporarily, exclusive, collision-free access to the bus of the bus system. According to one particular variant of the present invention, the predetermined switchover bit sequence and the predetermined check bit sequence may be situated in succession at the end of the first communication phase. According to another particular variant of the present invention, the predetermined switchover bit sequence and the predetermined check bit sequence may be situated in succession in a control field of the messages, at least one bit of the control field being situated after the predetermined switchover bit sequence and the predetermined check bit sequence at the end of the first communication phase.

The communication control device is possibly designed to transmit an error frame onto the bus when an error occurs in the switchover bit sequence.

At least two of the user stations described above may be part of a bus system which also includes a bus, so that the at least two user stations are connected to one another via the bus in such a way that they may communicate serially with one another. At least one of the at least two user stations is a user station described above.

The bus system described above possibly also includes at least one additional user station, which is designed only to generate bus states on the bus in a first and second communication phase in such a way that the second bus state may overwrite the first bus state, the at least one additional user station being connected via the bus to the at least two user stations in such a way that the user stations may communicate serially with one another, the at least one additional user station being designed to switch into a protocol exception state when the switchover bit sequence indicates that the communication control device of the at least one additional user station cannot understand the format used in the second communication phase.

Moreover, the object stated above may be achieved by a method for transmitting a message in a serial bus system according to an example embodiment of the present invention. In accordance with an example embodiment of the present invention, the method includes the steps: transmitting, via a communication control device, messages to a bus of the bus system and/or receiving, via the communication control device, messages from the bus of the bus system, checking via a format switchover checking unit whether the communication control devices of the bus system have switched a format of the messages from a first format in a first communication phase over to a second format for a second communication phase, and transmitting, via a transceiver device, in such a way that the transceiver device in the first format generates a first bus state for a first digital data state of the messages and a second bus state for the second digital data state of the messages in such a way that the second bus state can overwrite the first bus state, and in the second format generates different bus states in such a way that the bus states for the different digital data states of the messages cannot overwrite one another.

The method yields the same advantages as stated above with regard to the user station.

Further possible implementations of the present invention also include combinations, even if not explicitly stated, of features or specific embodiments described above or discussed below with regard to the exemplary embodiments. Those skilled in the art will also add individual aspects as enhancements or supplements to the particular basic form of the present invention, in view of the disclosure herein.

BRIEF DESCRIPTION OF THE DRAWINGS

The present invention is described in greater detail below with reference to the figures, and based on exemplary embodiments.

Unless stated otherwise, identical or functionally equivalent elements are provided with the same reference numerals in the figures.

DETAILED DESCRIPTION OF EXAMPLE EMBODIMENTS

Figure 1:
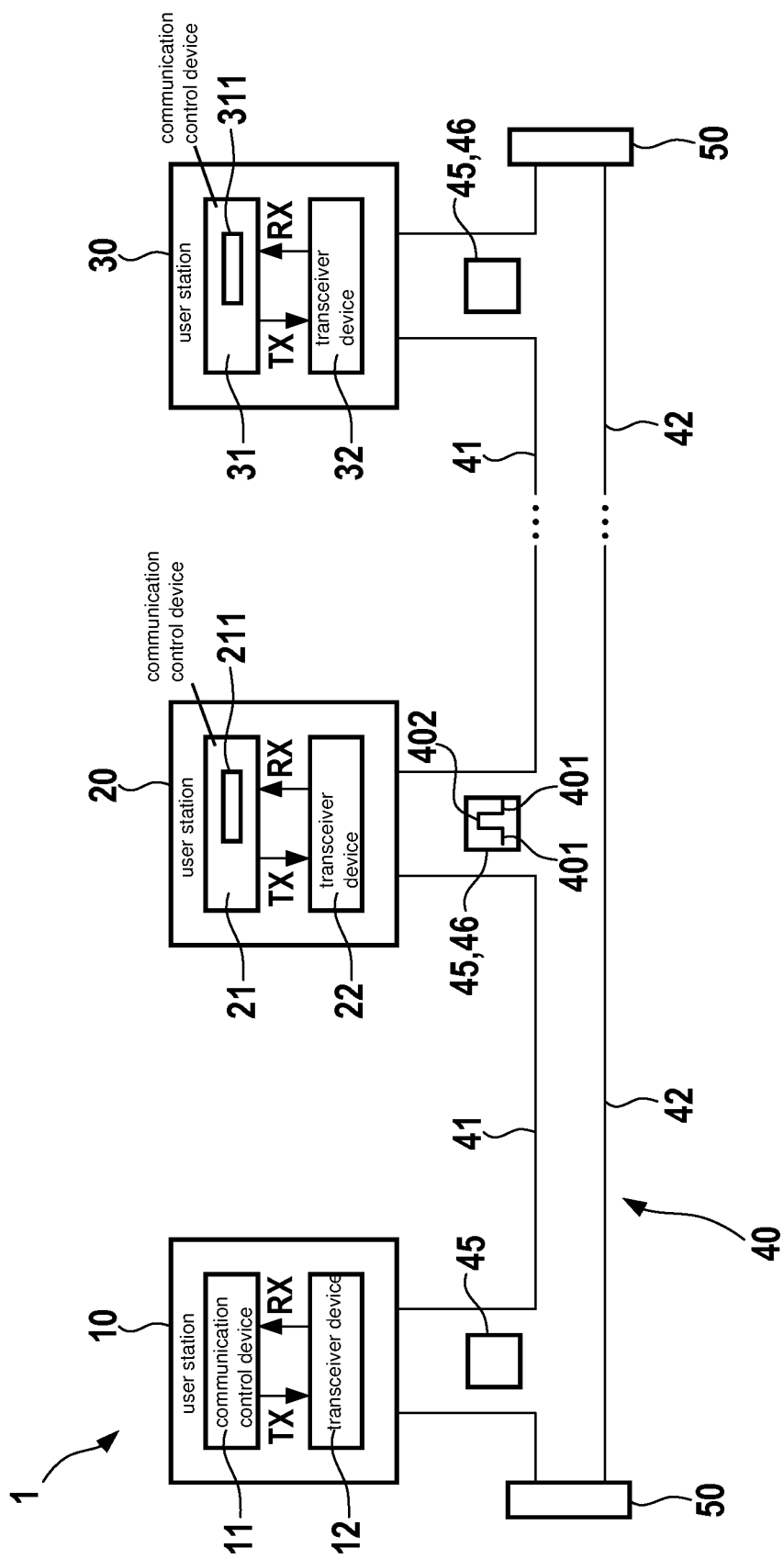
FIG. 1 shows a simplified block diagram of a bus system according to a first exemplary embodiment of the present invention.

FIG. 1 shows as an example a bus system 1 that is in particular the basis for a conventional CAN bus system, a CAN FD bus system, a CAN FD successor bus system, also referred to as a CAN NG bus system, and/or modifications thereof, as described below. Bus system 1 may be used in a vehicle, in particular a motor vehicle, an aircraft, etc., or in a hospital, and so forth.

In FIG. 1, bus system 1 includes a plurality of user stations 10, 20, 30, each of which is connected to a first bus wire 41 and a second bus wire 42 at a bus 40. Bus 40 at both of its ends is closed off via terminating resistors 50. Bus wires 41, 42 may also be referred to as CAN_H and CAN_L and, using a TX signal in the transmission state, are used for electrical signal transfer after coupling in the dominant levels or states 401, or generating or actively driving recessive levels or states 402. States 401, 402 are shown in a highly schematic manner only for user station 20. States 401, 402 correspond to the states of a TX signal of a transmitting user station 10, 20, 30. After signals CAN_H and CAN_L are transferred on bus wires 41, 42, the signals are received by user stations 10, 20, 30 as an RX signal. Via bus 40, messages 45, 46 in the form of signals CAN_H and CAN_L are serially transferable between individual user stations 10, 20, 30. User stations 10, 20, 30 are, for example, control units, sensors, display devices, etc., of a motor vehicle.

As shown in FIG. 1, user station 10 includes a communication control device 11 and a transceiver device 12. In contrast, user station 20 includes a communication control device 21 that includes a format switchover checking unit 211, and a transceiver device 22. User station 30 includes a communication control device 31 that includes a format switchover checking unit 311, and a transceiver device 32. Transceiver devices 12, 22, 32 of user stations 10, 20, 30 are each directly connected to bus 40, although this is not illustrated in FIG. 1.

Communication control devices 11, 21, 31 are each used for controlling a communication of particular user station 10, 20, 30 via bus 40 with one or multiple other user stations of user stations 10, 20, 30 connected to bus 40.

Communication control device 11 may be designed as a conventional CAN or CAN FD controller. Communication control device 11 creates or transmits and receives or reads first messages 45, which are conventional CAN messages or CAN FD messages, for example. Conventional CAN messages are built up according to the conventional base format, in which a number of up to 8 data bytes may be included in first message 45. The CAN FD message is built up according to the CAN FD format, in which a number of up to 64 data bytes may be included, which are transferred at a much faster, and thus higher, data rate than for the conventional CAN message. Transceiver device 12 may be designed as a conventional CAN transceiver and/or CAN FD transceiver.

Each of communication control devices 21, 31 creates or transmits and receives or reads first messages 45, as described above, or second messages 46. Second messages 46 are built up based on a CAN NG format, described in greater detail below. Each of transceiver devices 22, 32 may be designed as a CAN transceiver which may provide one of first messages 45 described above or a second message 46 according to the CAN NG format for associated communication control device 21, 31 or receive it from same, as needed.

Formation and then transfer of messages 46 having the CAN NG format, and also the reception of such messages 46, are achievable by use of the two user stations 20, 30.

Figures 2, 3:
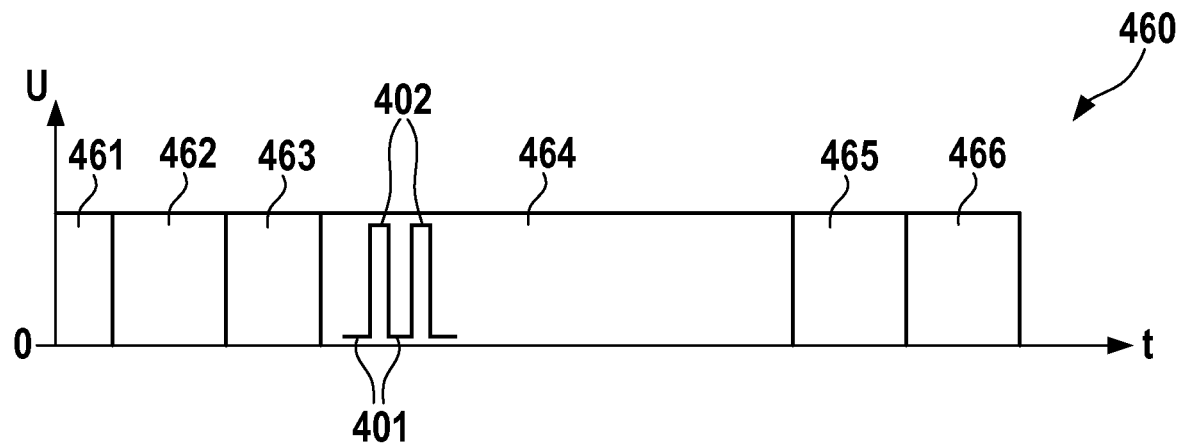
FIG. 2 shows a diagram for illustrating the design of messages that may be transmitted from user stations of the bus system according to the first exemplary embodiment of the present invention.
FIG. 3 shows a diagram for illustrating the design of a control field of messages that may be transmitted from user stations of the bus system according to the first exemplary embodiment of the present invention.

FIG. 2 shows for message 46 a CAN NG frame 460, which is transmitted from transceiver device 22 or transceiver device 32 onto bus 40 as a difference signal due to a TX signal or is received from the bus, from which the RX signal is generated. CAN NG frame 460 is divided into different fields for the CAN communication on bus 40, namely, a start field 461, an arbitration field 462, a control field 463, a data field 464, a check sum field 465, and an end field 466. Except for the differences of control field 463 described below, a frame for first message 45 is built up in the same way as frame 460.

Start field 461 includes one bit, for example, also referred to as an SOF bit, and indicates the start of frame. Arbitration field 462 contains an identifier including 32 bits, for example, for identifying the sender of the message. Arbitration field 462 may additionally contain a piece of protocol format information made up of one or multiple bits, which is suitable for distinguishing CAN NG frames from CAN frames or CAN FD frames. However, the following description assumes that the CAN NG frame (second message 46) is identical to the frame format for CAN FD (first message 45) except for the FDF bit.

Control field 463 contains a data length code that is 12 bits long, for example, which may assume values from 1 to 4096 with an increment of 1, or alternatively, values from 0 to 4095. The data length code may alternatively include fewer or more bits, and the value range and the increment may assume other values. Control field 463 additionally includes a piece of protocol format information made up of one or multiple bits, which is suitable for distinguishing CAN NG frames from CAN frames or CAN FD frames.

Data field 464 contains the useful data of the CAN NG frame or of message 46. The useful data may include up to 64 bytes or 4096 bytes, for example, or some other arbitrary number of bytes, corresponding to the value range of the data length code. Check sum field 465 contains a check sum concerning the data in data field 464, including the stuff bits, which are inserted by the sender of message 46 as inverse bits after every 5 or 10 identical bits, for example. End field 466 contains at least one acknowledge bit and also a sequence of 11 identical bits that indicate the end of CAN NG frame 460. The at least one acknowledge bit may be used to communicate whether or not a receiver has discovered an error in received CAN NG frame 460 or message 46.

A physical layer, similarly as with CAN and CAN FD, is used in the phases for transmitting arbitration field 462 and end field 466. An important point during these phases is that the conventional CSMA/CR method is used, which allows simultaneous access of user stations 10, 20, 30 to bus 40 without destroying higher-priority message 45, 46. It is thus possible to add further bus user stations 10, 20, 30 to bus system 1 in a relatively simple manner, and the communication bandwidth is utilized very efficiently, which is very advantageous.

Consequently, the CSMA/CR method must provide so-called recessive states 402 on bus 40, which may be overwritten by other user stations 10, 20, 30 with dominant states 401 on bus 40. In recessive state 402, high-impedance conditions prevail at individual user station 10, 20, 30, which in combination with the parasites of the bus wiring result in longer time constants. This results in a limitation of the maximum bit rate of the present-day CAN FD physical layer to approximately 2 megabits per second at the present time during actual vehicle use.

Control field 463 and data field 464 are transmitted by a sender of message 46 onto bus 40 only after user station 20 or user station 30, as the sender, has won the arbitration, and user station 20, as the sender for transmitting fields 463 through 466, thus has exclusive access to bus 40 of bus system 1. During the arbitration, with the aid of the identifier in arbitration field 462, bit-by-bit negotiation is carried out between user stations 10, 20, 30 concerning which user station 10, 20, 30 is allowed to transmit message 45, 46 having the highest priority, and therefore for the next time period for transmitting fields 463 through 465, obtains exclusive access to bus 40 of bus system 1.

The arbitration at the start of a frame 460 or of message 45, 46, and the acknowledgment in end field 466 at the end of frame 460 or of message 45, 46, is possible only when the bit time is much more than twice as long as the signal propagation time between two arbitrary user stations 10, 20, 30 of bus system 1. Therefore, the bit rate in the arbitration phase during transfer of fields 461, 462, and 466 is selected to be slower, and thus lower, than in the other fields of frame 460. In particular, the bit rate in the arbitration phase is selected as 500 kbit/s, resulting in a bit time of approximately 2 μs, whereas the bit rate in the other communication phase(s) is selected, for example, as 5 to 8 Mbit/s or greater, resulting in a bit time of approximately 0.2 μs and less. The bit time of the signal in the arbitration phase is thus greater than the bit time of the signal in the other communication phase(s) by, for example, a factor of 4 or 10, etc. The factor for the bit time is arbitrarily selectable.

Each of user stations 10, 20, 30 may transmit and receive CAN FD frames, but user station 10 cannot transmit or receive CAN NG frames 460. For example, if user station 20 transmits a CAN NG frame 460, CAN FD user station 10 goes into the protocol exception state and thus ignores CAN NG frame 460 of user station 20. For CAN NG message 46 a new, alternative frame format, namely, frame 460, is used. In this frame format, a switchover is made from the CAN FD frame format to the CAN NG frame format with the aid of res bits in control field 463. The frame formats of CAN FD and CAN NG are the same except for the first res bit. Thus, user stations 20, 30 each also support CAN FD.

According to FIG. 3, for such a communication in bus system 1, communication control devices 21, 31 create or transmit messages 46 in such a way that directly successive bits FDF, res, res2, res3, and res4 in control field 463 are transmitted as recessive (logical 1). In addition, the bit preceding the FDF bit, denoted as –FDF in FIG. 3, is set to dominant (logical 0). The res3 bit is transmitted in succession up to five times, so that 1 to 5 bits are transmitted at this location. The shown value sequence for the FDF bit and the res bit forms the switchover condition or predetermined switchover bit sequence for a CAN NG frame. The sequence of the values for res2, res3, and res4 as recessive (logical 1) is a predetermined check bit sequence that is used to safeguard the switchover to a CAN NG frame.

In contrast, according to FIG. 3, messages 45 for conventional CAN, abbreviated in FIG. 3 as CL. CAN, are created in such a way that communication control devices 11, 21, 31 in control field 463 set the FDF bit to dominant (logical 0), the value of the bit preceding the FDF bit and the bits after the FDF bit being arbitrary, as illustrated by the symbol "x" in FIG. 3. There are no res bits or res2 bits in conventional CAN.

In addition, according to FIG. 3, messages 45 for CAN FD are created in such a way that communication control devices 11, 21, 31 in control field 463 set the FDF bit to recessive (logical 1), and set the bit preceding the FDF bit as well as the res bit to dominant (logical 0). The value of the bits that follow the res bit is arbitrary, as illustrated by the symbol "x" in FIG. 3. The shown value sequence for the FDF bit and the res bit forms the switchover condition for a CAN FD frame.

The importance of individual bits res, res2, res3, and res4 is described in greater detail below. In the description, it is assumed that a CAN NG user station transmits a CAN NG frame 460.

Figure 5:
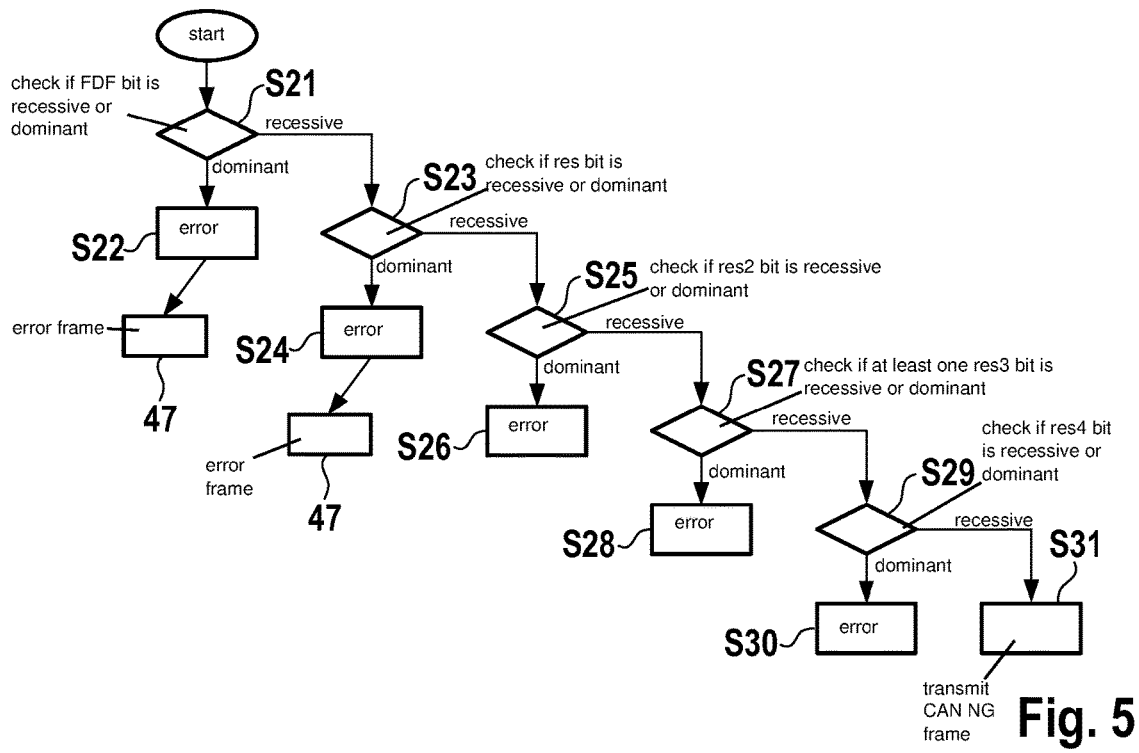
FIG. 5 shows a flowchart of a method that is carried out by the user station in the first exemplary embodiment of the present invention when the user station switches from receiving and reading messages according to the CAN FD format to receiving and reading messages according to the faster message format.

Properties of the res bit:
In the CAN FD protocol, the res bit is already reserved for new formats.
res=0 identifies the CAN FD frame format.
res=1 identifies new, alternative frame format 460 that is used by CAN NG.
When there is an error of transmission signal TX or the TX signal in the res bit, user station 20, 30 or the TX user station transmitting the TX signal transmits an error frame 47 (error flag), as shown in FIG. 5, and does not switch over to the alternative format according to frame 460.
An error of reception signal RX or the RX signal in the res bit is not detectable by a receiving user station 10, 20, 30 or RX user station; this detection takes place via successive bits res2, res3, res4.

Properties of the res2 bit:
The res2 bit is used to detect an error frame 47 (error flag) in the RX signal of receiving user station 20, 30 or the RX user station. This error frame 47 is transmitted by a user station 20, 30 or TX user station, which transmits the TX signal, when this user station detects an error of transmission signal TX in the res bit, i.e., when a user station 20, 30 transmitting the TX signal transmits res=1 but "sees" res=0 in the RX signal. This corresponds to the latest possible error of the TX signal during the switchover.
The expected value of res2 is res2=1.

Properties of the res3 bit(s) (1 to a maximum of 5 bits: res3a, res3b, res3c, res3d, res3e):
The res3 bits trigger a stuff error that is detected in the RX signal by receiving user stations 10, 20, 30, since receiving user stations 10, 20, 30 have "seen" res=0 (instead of res=1) due to a bit error. This means that receiving user stations 10, 20, 30 now mistakenly expect a CAN FD frame for a message 45. A receiving user station 10, 20, 30 that expects a CAN FD frame for a message 45 switches to a higher bit rate after res2=1 (corresponding to the BRS bit in the FD format), as the result of which res3 is duplicated for receiving user station 10, 20, 30.
The number of res3 bits is either set by the user in the CAN controller of the CAN NG node via configuration registers, or is computed by communication control device 21, 31 of associated CAN NG user station 20, 30 from the CAN FD bit timing settings, which include, among other things, the length of a bit as well as the temporal position of the sampling point for sampling the bit. Communication control device 21, 31 includes these settings due to the fact that it may also transmit and receive CAN FD frames.
The number of res3 bits is at least equal to 1, so that the res3a bit is the only bit, and the maximum number is equal to 5, so that the res3 bit includes bits res3a, res3b, res3c, res3d, res3e.

All res3 bits have an expected value of 1.

In the application,

One res3 bit is sufficient, starting at a CAN FD bit rate ratio of approximately 4 or greater, the exact value of the CAN FD bit rate ratio being a function of the bit sampling point positions in the data phase and the arbitration phase. The CAN FD bit rate ratio is understood to mean the ratio between the bit rate in bits per second that is used for transferring bits in the data phase (data bit rate), and the bit rate in bits per second that is used for transferring bits in the arbitration phase (arbitration bit rate).

Two res3 bits are sufficient, starting at a CAN FD bit rate ratio of approximately 2.5.

Five res3 bits are sufficient when no bit rate switchover is used for CAN FD.

One or a maximum of two res3 bits is/are sufficient for the present most typical CAN FD bit rate ratio of 4 (500 kbit/s for the arbitration bit rate and 2 Mbit/s for the data bit rate).

Properties of the res4 bit:

The res4 bit is used to detect an error frame 47, in user station 20, 30 transmitting the TX signal and user stations 10, 20, 30 receiving the resulting RX signal, that is transmitted due to the latest possible error in the RX signal (res=0 instead of res=1) during the switchover from a user station 10, 20, 30 that receives the RX signal.

The expected value of res4 is res4=1.

The res4 bit is optionally used to switch over to a different frame format, not described here.

Upon receipt of res4=0, user station 20, 30 switches into the protocol exception state, for example, and waits until bus 40 is once again free.

Figure 4:
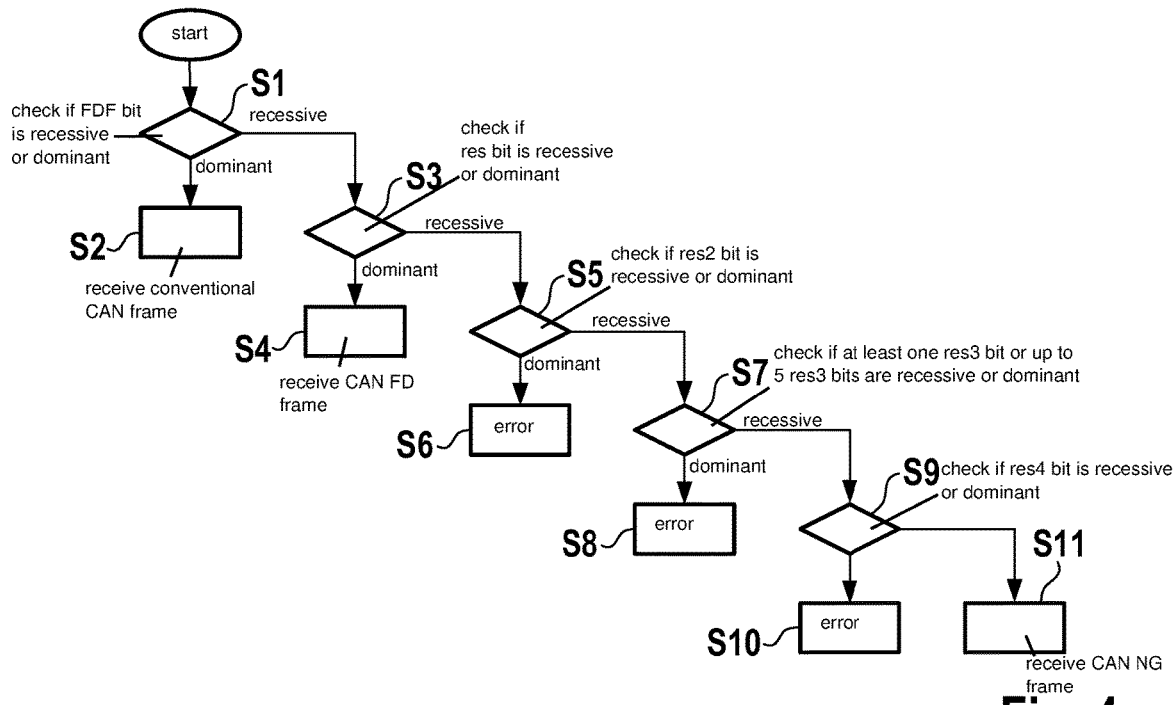
FIG. 4 shows a flowchart of a method that is carried out by the user station in the first exemplary embodiment when the user station has switched from generating messages according to the CAN FD format to generating messages according to the faster message format, in accordance with the present invention.

FIG. 4 shows the resulting routine that is executed by format switchover checking units 211, 311 and/or some other unit of user station 20 during operation of bus system 1 for the received RX signal of frame 460 for an RX user station. An RX user station is a user station which, after arbitration of frame 460 is completed, acts only as a receiver of message 46 that is transmitted by some other user station of bus system 1, as the sender, that has won the arbitration. For simplification, only the operation of format switchover checking unit 211 is described below, although the same applies for format switchover checking unit 311.

After the method starts, format switchover checking unit 211 and/or some other unit of user station 20 optionally check(s) in a step S1 as to whether the FDF bit of the received RX signal is recessive (logical 1) or dominant (logical 0) in order to decide whether a conventional CAN frame of a message 45 is present. If the FDF bit of the received RX signal is dominant (logical 0), format switchover checking unit 211 and/or the other unit of user station 20 proceed(s) to a step S2. However, if the FDF bit of the received RX signal is recessive (logical 1), format switchover checking unit 211 and/or the other unit of user station 20 proceed(s) to a step S3.

Format switchover checking unit 211 and/or the other unit of user station 20 decide(s) in step S2 that a conventional CAN frame of a message 45 is present. Transceiver device 22 thus receives from bus 40 the conventional CAN frame of message 45 with the physical layer for messages in the ISO 11898-2:2016 standard.

Format switchover checking unit 211 and/or some other unit of user station 20 check(s) in step S3 as to whether the res bit of the received RX signal is recessive (logical 1) or dominant (logical 0) in order to decide whether a CAN FD frame of a message 45 is present. If the res bit of the received RX signal is dominant (logical 0), format switchover checking unit 211 and/or the other unit of user station 20 proceed(s) to a step S4. However, if the res bit of the received RX signal is recessive (logical 1), format switchover checking unit 211 and/or the other unit of user station 20 proceed(s) to a step S5.

It is certain in step S4 that a CAN FD frame is involved. Format switchover checking unit 211 and/or the other unit of user station 20 decide(s), with a check of the BRS bit, whether a bit rate switchover is present in the CAN FD frame of a message 45. If this is the case, transceiver device 22 receives from bus 40 CAN FD frame of message 45 with the physical layer for messages in the ISO 11898-2:2016 standard.

Format switchover checking unit 211 checks in step S5 as to whether the res2 bit of the received RX signal is recessive (logical 1) or dominant (logical 0) in order to decide whether an alternative frame format for a message 46, for example, is present. If the res2 bit of the received RX signal is dominant (logical 0), format switchover checking unit 211 proceeds to a step S6. However, if the res bit of the received RX signal is recessive (logical 1), format switchover checking unit 211 proceeds to a step S7.

Format switchover checking unit 211 decides in step S6 that an error is present. For the time during which remaining control field 463 and fields 464 through 465 are being received from bus 40, communication control unit 21 thus goes into a protocol exception state or transmits an error frame 47 (error flag) to bus 40.

Format switchover checking unit 211 checks in step S7 as to whether the at least one res3 bit or the up to 5 res3 bits of the received RX signal is/are recessive (logical 1) or dominant (logical 0) in order to decide, in an additional switchover check, whether an alternative frame format for a message 46, for example, is present. If the at least one res3 bit of the received RX signal is dominant (logical 0), format switchover checking unit 211 proceeds to a step S8. However, if all res3 bits of the received RX signal are recessive (logical 1), format switchover checking unit 211 proceeds to a step S9.

Format switchover checking unit 211 decides in step S8 that an error is present. For the time during which remaining control field 463 and fields 464 through 465 are being received from bus 40, communication control unit 21 thus goes into a protocol exception state or transmits an error frame 47 (error flag) to bus 40.

Format switchover checking unit 211 checks in step S9 as to whether the res4 bit of the received RX signal is recessive (logical 1) or dominant (logical 0) in order to decide in an additional switchover check whether an alternative frame format for a message 46, for example, is present. If the res4 bit of the received RX signal is dominant (logical 0), format switchover checking unit 211 proceeds to a step S10. However, if the res4 bit of the received RX signal is recessive (logical 1), format switchover checking unit 211 proceeds to a step S11.

Format switchover checking unit 211 decides in step S10 that an error is present. For the time during which remaining control field 463 and fields 464 through 465 are being received from bus 40, communication control unit 21 thus goes into a protocol exception state or transmits an error frame 47 (error flag) to bus 40.

Format switchover checking unit 211 decides in step S11 that a CAN NG frame of a message 46 is present and the physical layer is now to be switched over. Transceiver device 22, and ultimately communication control device 21, thus receives the CAN NG frame of message 46 with a physical layer for messages 46 from bus 40 that is different from the physical layer for messages in the ISO 11898-1: 2015 standard. For the physical layer for messages 46, bus state 402 (logical 1) as well as bus state 401 (logical 0) are actively driven. In addition, error frames 47 (error flags) are not provided during the transfer of data field 464. With such a physical layer for CAN NG, much higher bit rates may be achieved than with CAN FD.

The method according to FIG. 4 is subsequently ended.

Format switchover checking unit 211 thus carries out the safeguarding of the switchover to CAN NG according to steps S5 through S11. In addition, format switchover checking unit 211 may also carry out other functions for the switchover, even if these functions may alternatively or additionally be carried out by at least one other unit of user station 20.

FIG. 5 shows the routine that is executed by format switchover checking units 211, 311 and/or some other unit of user station 20 during operation of bus system 1 for a TX signal of a frame 460 to be transmitted, i.e., when associated user station 20, 30 has won the arbitration and therefore acts as sender of a CAN NG frame 460 or message 46 in the subsequent phase for transmitting fields 463 through 466. For simplification, it is assumed below that user station 20 acts as sender of the TX signal, and therefore only the operation of format switchover checking unit 211 is described. When user station 30 acts as a sender of the TX signal, format switchover checking unit 311 acts in the same way as format switchover checking unit 211.

Communication control device 21 transmits bits FDF, res, res2, res3, res4 as logical 1 with the aid of the TX signal. Transceiver device 12 thus applies a recessive signal at the bus (corresponding to logical 1). During the transmission operation, format switchover checking unit 211 and/or some other unit of user station 20 monitor(s) the RX signal to check whether the host TX signal is present, or whether an interference has occurred, i.e., a dominant (logical 0) signal is present.

After the method starts, format switchover checking unit 211 and/or some other unit of user station 20 check(s) in a step S21 as to whether the FDF bit of the RX signal is recessive (logical 1) or dominant (logical 0). If the FDF bit of the received RX signal is dominant (logical 0), format switchover checking unit 211 and/or the other unit of user station 20 proceed(s) to a step S22. However, if the FDF bit of the RX signal is recessive (logical 1), format switchover checking unit 211 and/or the other unit of user station 20 proceed(s) to a step S23.

Format switchover checking unit 211 and/or the other unit of user station 20 decide(s) in step S22 that an error is present. Communication control device 21 thus transmits an error frame 47 (error flag) to bus 40.

Format switchover checking unit 211 and/or some other unit of user station 20 check(s) in step S23 as to whether the res bit of the RX signal is recessive (logical 1) or dominant (logical 0). If the res bit of the RX signal is dominant (logical 0), format switchover checking unit 211 and/or the other unit of user station 20 proceed(s) to a step S24. However, if the res bit of the RX signal is recessive (logical 1), format switchover checking unit 211 and/or the other unit of user station 20 proceed(s) to a step S25.

Format switchover checking unit 211 and/or the other unit of user station 20 decide(s) in step S24 that an error is present. Communication control device 21 thus transmits an error frame 47 (error flag) to bus 40.

Format switchover checking unit 211 checks in step S25 as to whether the res2 bit of the RX signal is recessive (logical 1) or dominant (logical 0) in order to decide whether an alternative frame format for a message 46, for example, is present. If the res2 bit of the RX signal is dominant (logical 0), format switchover checking unit 211 proceeds to a step S26. However, if the res bit of the RX signal is recessive (logical 1), format switchover checking unit 211 proceeds to a step S27.

Format switchover checking unit 211 decides in step S26 that an error is present. During the time for transmitting remaining control field 463 and fields 464 through 465, communication control unit 21 thus goes into a protocol exception state. Alternatively, it is possible for communication control device 21 to transmit an error frame 47 (error flag) to bus 40.

Format switchover checking unit 211 checks in step S27 as to whether the at least one res3 bit of the RX signal is recessive (logical 1) or dominant (logical 0) in order to decide in an additional switchover check whether an alternative frame format for a message 46, for example, is present. If at least one bit of the at least one res3 bit of the RX signal is dominant (logical 0), format switchover checking unit 211 proceeds to a step S28. However, if all res3 bits of the RX signal are recessive (logical 1), format switchover checking unit 211 proceeds to a step S29.

Format switchover checking unit 211 decides in step S28 that an error is present. During the time for transmitting remaining control field 463 and fields 464 through 465, communication control unit 21 thus goes into a protocol exception state. Alternatively, it is possible for communication control device 21 to transmit an error frame 47 (error flag) to bus 40.

Format switchover checking unit 211 checks in step S29 as to whether the res4 bit of the RX signal is recessive (logical 1) or dominant (logical 0) in order to decide in an additional switchover check whether an alternative frame format for a message 46, for example, is present. If the res4 bit of the RX signal is dominant (logical 0), format switchover checking unit 211 proceeds to a step S30. However, if the res4 bit of the RX signal is recessive (logical 1), format switchover checking unit 211 proceeds to a step S31.

Format switchover checking unit 211 decides in step S30 that an error is present. During the time for transmitting remaining control field 463 and fields 464 through 465, communication control unit 21 thus goes into a protocol exception state. Alternatively, it is possible for communication control device 21 to transmit an error frame 47 (error flag) to bus 40.

Format switchover checking unit 211 decides in step S31 that a CAN NG frame of a message 46 is present and that a switch from the physical layer for messages 45 over to the physical layer for messages 46 may be made. Communication control device 21 thus transmits CAN NG frame 460 of message 46 with the physical layer for messages 46 to bus 40, as described above.

The method according to FIG. 5 is subsequently ended.

Format switchover checking unit 211 thus carries out the safeguarding of the switchover to CAN NG according to steps S25 through S31. In addition, format switchover checking unit 211 may also carry out other functions for the switchover, even if these functions may alternatively or additionally be carried out by at least one other unit of user station 20.

As mentioned above, the safeguarding of the switchover takes place via bits res2 through res4. The safeguarding of the switchover (res2 through res4) is excluded from the CAN stuffing rule. Thus, the bit sequence of bits res2 through res4 never contains a dominant stuff bit. This applies even if a recessive stuff bit (logical 1) has been inserted preceding the recessive FDF bit (logical 1). If one of bits res2 through res4 from a receiving CAN NG user station 20, 30 or a transmitting TX user station 10, 20, 30 is regarded as dominant, the switchover to the CAN NG frame format has not been successful in all user stations 10, 20, 30. The CAN NG protocol will respond to this, as described above, for example by making no switchover of the bit rate and/or physical layer, and for example transmitting an error frame 47.

In general, in the bus system with CAN NG, in comparison to CAN FD the following deviant properties may be achieved:

a) acquiring and optionally adapting proven properties that are responsible for the robustness and user-friendliness of CAN FD, in particular a frame structure including identifiers and arbitration according to the CSMA/CR method, b) a substantial increase in the net data transfer rate, c) For transmitting data field 464, i.e., in the data phase, CAN NG uses a different physical layer than does CAN FD, for example a physical layer in which both bus states are actively driven, and error frames (error flags) are not provided during data phase 468. With such a physical layer for CAN NG, much higher bit rates may be achieved than with CAN FD.

Table 1 below illustrates a first example in which a successful switchover to the CAN NG frame format takes place according to a frame 460 for a message 46. The example is based on the assumption that user station 30 transmits a CAN NG frame 460 for a message 46.

TABLE 1

|  |  | Bit before FDF | FDF | res | res2 | res3a | res4 |
|---|---|---|---|---|---|---|---|
| User station 10 (CAN FD) | TX | 1 | 1 | 1 | 1 | 1 | 1 |
| RX user station | RX | 0 | 1 | 1 | Protocol exception state | | |
| User station 20 (CAN NG) | TX | 1 | 1 | 1 | 1 | 1 | 1 |
| RX user station | RX | 0 | 1 | 1 | 1 | 1 | 1 |
| User station 30 (CAN NG) | TX | 0 | 1 | 1 | 1 | 1 | 1 |
| TX user station | RX | 0 | 1 | 1 | 1 | 1 | 1 |

In Table 1, the temporal length of a bit corresponds to the temporal length of an arbitration bit time. The bits of Table 1, starting from the left in Table 1, are transmitted in chronological succession, and thus continuously to the right in Table 1.

Table 2 below, which is designed analogously to Table 1, illustrates a second example in which an error occurs in the TX signal in the last possible bit of the switchover, i.e., the res bit. Thus, the res bit in the TX signal of user station 30 is dominant (logical 0) instead of recessive (logical 1). The example is based on the assumption that user station 30 transmits a CAN NG frame 460 for a message 46. It is shown here that, with the aid of the safeguarding of the switchover in the form of bits res2, res3a, res4, it is apparent in all user stations 10, 20, 30 that an error has occurred in at least one of user stations 10, 20, 30.

TABLE 2

|  |  | Bit before FDF | FDF | res | res2 | res3a | res4 |
|---|---|---|---|---|---|---|---|
| User station 10 (CAN FD) | TX | 1 | 1 | 1 | 1 | 1 | 1 |
| RX user station | RX | 0 | 1 | 1 | Protocol exception state | | |
| User station 20 (CAN NG) | TX | 1 | 1 | 1 | 1 | 0 | 0 |
| RX user station | RX | 0 | 1 | 1 | 0 | 0 | 0 |
| User station 30 (CAN NG) | TX | 0 | 1 | 1 | 0 | 0 | 0 |
| TX user station | RX | 0 | 1 | 0 | 0 | 0 | 0 |

User station 20 receives error frame 47 beginning with the res2 bit. Beginning with the next bit, user station 20 also transmits an error frame 47. User station 30 transmits error frame 47 beginning with the res2 bit.

Table 3 below, which is designed analogously to Table 1, illustrates a third example in which an error occurs in the RX signal in the last possible bit of the switchover, i.e., the res bit. The example is based on the assumption that user station 30 transmits a CAN NG frame 460 for a message 46, and the res bit in the RX signal of user station 20 is dominant (logical 0) instead of recessive (logical 1). It is shown here that, with the aid of the safeguarding of the switchover in the form of bits res2, res3a, res4, it is apparent in all user stations 10, 20, 30 that an error has occurred in at least one of user stations 10, 20, 30. The CAN FD bit rate ratio is 4; i.e., the number of res3 bits is configured to 1 so that only bit res3a is transmitted. In Table 3, the temporal length of the 5 bits following the BRS bit for user station 20 corresponds in each case to the temporal length of a CAN FD data bit time. The length of all other bits of all user stations 10, 20, 30 corresponds in each case to an arbitration bit time.

TABLE 3

| | | Bit before FDF | FDF | res | res2 | res3a | res4 |
|---|---|---|---|---|---|---|---|
| User station 10 (CAN FD) | TX | 1 | 1 | 1 | 1 | 1 | 1 |
| RX user station | RX | 0 | 1 | 1 | Protocol exception state | | |
| User station 20 (CAN NG) | TX | 1 | 1 | 1 | 1 | 1 | 0 |
| RX user station | RX | 0 | 1 | 0 | 1 (BRS) 1 1 1 1 1 | | 0 |
| User station 30 (CAN NG) | TX | 0 | 1 | 1 | 1 | 1 | 1 |
| TX user station | RX | 0 | 1 | 1 | 1 | 1 | 0 |

User station 20 transmits an error frame 47 beginning with the res4 bit.

Table 4 below, which is designed analogously to Table 1, illustrates a fourth example in which an error occurs in the RX signal in the last possible bit of the switchover, i.e., the res bit. The example is based on the assumption that user station 30 transmits a CAN NG frame 460 for a message 46, and the res bit in the RX signal of user station 20 is dominant (logical 0) instead of recessive (logical 1). It is shown here that, with the aid of the safeguarding of the switchover in the form of bits res2, res3, res4, it is apparent in all user stations 10, 20, 30 that an error has occurred in at least one of user stations 10, 20, 30. The CAN FD bit rate ratio is 2.5; i.e., the number of res3 bits is configured to 2 so that only bits res3a, res3b are transmitted. In Table 4, the temporal length of the 5 bits following the BRS bit for user station 20 corresponds in each case to the temporal length of a CAN FD data bit time. The length of all other bits of all user stations 10, 20, 30 corresponds in each case to an arbitration bit time.

User station 20 transmits an error frame 47 beginning with the res4 bit.

All of the above-described embodiments of communication control devices 21, 31, of transceiver devices 22, 32, of format switchover checking units 211, 311, of user stations 20, 30, of bus system 1, and of the method carried out therein may be used alone or in any possible combination. In particular, all features of the above-described exemplary embodiments and/or modifications thereof may be arbitrarily combined. Additionally or alternatively, in particular the following modifications are possible.

Above-described bus system 1 according to the exemplary embodiments is described with reference to a bus system based on the CAN protocol. However, bus system 1 according to the exemplary embodiments may also be some other type of communications network in which data are serially transferable at two different bit rates. It is advantageous, but not a mandatory requirement, that in bus system 1, exclusive, collision-free access of a user station 10, 20, 30 to a shared channel is ensured, at least for certain time periods.

The number and arrangement of user stations 10, 20, 30 in bus system 1 of the exemplary embodiments is arbitrary. In particular, user station 10 in bus system 1 may be dispensed with. It is possible for one or multiple of user stations 20 or 30 to be present in bus system 1.

At least one of format switchover checking units 211, 311 is possibly situated externally from transceiver device 22, 32. In particular, at least one of format switchover checking units 211, 311 is provided as a separate unit of user station 20, 30.

What is claimed is:

1. A user station for a serial bus system, comprising:
   a communication control device configured to transmit messages to a bus of the bus system and/or to receive messages from the bus of the bus system;
   a format switchover checking unit configured to check whether communication control devices of the bus system have switched over a format of the messages

TABLE 4

| | | Bit before FDF | FDF | res | res2 | res3a | res3b | res4 |
|---|---|---|---|---|---|---|---|---|
| User station 10 (CAN FD) | TX | 1 | 1 | 1 | 1 | 1 | 1 | 1 |
| RX user station | RX | 0 | 1 | 1 | Protocol exception state | | | |
| User station 20 (CAN NG) | TX | 1 | 1 | 1 | 1 | 1 | | 0 |
| RX user station | RX | 0 | 1 | 0 | 1 (BRS) 1 1 1 1 1 | | | 0 |
| User station 30 (CAN NG) | TX | 0 | 1 | 1 | 1 | 1 | 1 | 1 |
| TX user station | RX | 0 | 1 | 1 | 1 | 1 | 1 | 0 | from a first format in a first communication phase to a second format for a second communication phase; and
a transceiver device which, for transmitting in the first format, is configured to generate a first bus state for a first digital data state of the messages and a second bus state for a second digital data state of the messages in such a way that the second bus state can overwrite the first bus state, and wherein the transceiver device, for transmitting in the second format, is configured to generate different bus states in such a way that bus states for different digital data states of the messages cannot overwrite one another.

2. The user station as recited in claim 1, wherein the communication control device is configured to switch the format over from the first format into the second format, and thus to change into the second communication phase, based on a predetermined switchover bit sequence in the first communication phase, and wherein the format switchover checking unit is configured to check whether the communication control devices of the bus system have switched over from the first format to the second format, using a predetermined check bit sequence that is transmitted after the predetermined switchover bit sequence.

3. The user station as recited in claim 2, wherein the predetermined switchover bit sequence constitutes an FDF bit and a res bit of a CAN message.

4. The user station as recited in claim 2, wherein the predetermined check bit sequence includes a res2 bit, a res3 bit, and a res4 bit that are situated after the res bit of the CAN message, and a res3 bit being transmitted at least one to five times in succession.

5. The user station as recited in claim 2, wherein the communication control device is configured to transmit and/or to receive bits of each message with a lower bit rate in the first communication phase than in the second communication phase.

6. The user station as recited in claim 5, wherein the communication control device is configured to transmit the predetermined switchover bit sequence and the predetermined check bit sequence at the lower bit rate for the first communication phase.

7. The user station as recited in claim 2, wherein in the first communication phase it is negotiated, between user stations of the bus system, which of the user stations in a subsequent second communication phase has, at least temporarily, exclusive, collision-free access to the bus of the bus system, and the predetermined switchover bit sequence and the predetermined check bit sequence being situated in succession at an end of the first communication phase.

8. The user station as recited in claim 2, wherein in the first communication phase, it is negotiated, between user stations of the bus system, which of the user stations in a subsequent second communication phase has, at least temporarily, exclusive, collision-free access to the bus of the bus system, and the predetermined switchover bit sequence and the predetermined check bit sequence being situated in succession in a control field of the messages, at least one bit of the control field being situated after the predetermined switchover bit sequence and the predetermined check bit sequence at an end of the first communication phase.

9. The user station as recited in claim 2, wherein the communication control device is configured to transmit an error frame onto the bus when an error occurs in the predetermined switchover bit sequence.

10. A bus system, comprising:
a bus; and
at least two user stations that are connected to one another via the bus in such a way that they may communicate serially with one another, and of which at least one user station is a user station including:
a communication control device configured to transmit messages to the bus of the bus system and/or to receive messages from the bus of the bus system,
a format switchover checking unit configured to check whether communication control devices of the bus system have switched over a format of the messages from a first format in a first communication phase to a second format for a second communication phase, and
a transceiver device which, for transmitting in the first format, is configured to generate a first bus state for a first digital data state of the messages and a second bus state for a second digital data state of the messages in such a way that the second bus state can overwrite the first bus state, and wherein the transceiver device, for transmitting in the second format, is configured to generate different bus states in such a way that bus states for different digital data states of the messages cannot overwrite one another.

11. The bus system as recited in claim 10, wherein the communication control device of the at least one user station is configured to switch the format over from the first format into the second format, and thus to change into the second communication phase, based on a predetermined switchover bit sequence in the first communication phase, and wherein the format switchover checking unit is configured to check whether the communication control devices of the bus system have switched over from the first format to the second format, using a predetermined check bit sequence that is transmitted after the predetermined switchover bit sequence, and wherein the bus system further comprises:
at least one additional user station that is configured to generate the bus states on the bus in the first and second communication phase only in such a way that the second bus state may overwrite the first bus state, the at least one additional user station being connected via the bus to the at least two user stations in such a way that the at least one additional user station and the at least two user stations may communicate serially with one another, the at least one additional user station being configured to switch into a protocol exception state when the switchover bit sequence indicates that a communication control device of the at least one additional user station cannot understand a format used in the second communication phase.

12. A method for transmitting a message in a serial bus system, the method comprising the following steps:
transmitting, via a communication control device, messages to a bus of the bus system and/or receiving, via the communication control device, messages from the bus of the bus system;
checking via a format switchover checking unit whether communication control devices of the bus system have switched a format of the messages from a first format in a first communication phase over to a second format for a second communication phase; and
transmitting the messages, via a transceiver device, in such a way that the transceiver device in the first format generates a first bus state for a first digital data state of the messages and a second bus state for the second digital data state of the messages in such a way that the second bus state can overwrite the first bus state, and in the second format generates different bus states in such a way that bus states for different digital data states of the messages cannot overwrite one another.

\* \* \* \* \*